United States Patent [19]

Truchinski

[11] Patent Number: 5,301,973
[45] Date of Patent: Apr. 12, 1994

[54] EXTERIOR ADJUSTABLE SUSPENSION PRECOMPRESSION FORK CAP MECHANISM FOR TWO WHEELED VEHICLES

[76] Inventor: Rich Truchinski, 27930 N. Tyler #402, Santa Clarita, Calif. 91351

[21] Appl. No.: 909,282

[22] Filed: Jul. 6, 1992

[51] Int. Cl.⁵ .............................................. B62K 21/22
[52] U.S. Cl. .................................. 280/276; 280/280; 267/177
[58] Field of Search ............... 280/275, 276, 279, 280, 280/283; 180/219; 267/170, 177

[56] References Cited

U.S. PATENT DOCUMENTS

| | | | |
|---|---|---|---|
| 3,984,119 | 10/1976 | Okazima | 280/276 |
| 4,881,750 | 11/1989 | Hartmann | 280/276 |
| 5,009,451 | 4/1991 | Hayashi et al. | 280/276 X |

*Primary Examiner*—David M. Mitchell
*Assistant Examiner*—Andrew C. Pike

[57] ABSTRACT

An improvement for two wheeled vehicle fork suspension systems, primarily motorcycles and bicycles such as street bikes, dual purpose bikes, motocross bikes, and mountain bikes. The improved design allows precompression to main suspension spring to be externally adjusted by designing precompression adjuster hub with a low profile adjuster grip area. The fork cap is adjustable from the outside eliminating the need to disassemble suspension column to increase or decrease precompression adjustment.

12 Claims, 1 Drawing Sheet

BEST AVAILABLE COPY

EXTERIOR ADJUSTABLE SUSPENSION PRECOMPRESSION FORK CAP MECHANISM FOR TWO WHEELED VEHICLES

FIELD OF INVENTION

The present invention relates in general to an adjustable suspension component, more particularly an externally adjustable precompression fork cap design for popular two wheeled vehicle suspension systems.

DESCRIPTION OF PRIOR ART

Traditional two wheeled vehicle suspension designs have for the most part utilized a fork cap that housed and retained internal components such as compression springs, internal valving and oil. There was no precompression adjustment offered. The fork cap spoken of is usually threaded into the top side of the fork closest to the handlebars. This design gained popularity because of its simplicity and low cost of manufacturing. However, as time went on, the suspension on two wheeled vehicles became more and more technical and the need for fine tuning became more and more apparent.

A significant improvement came when a shrader valve was included in the fork cap to allow the addition of air pressure in the suspension shock absorber column. This was found to be ineffective since air pressure build up during use must be released and no additional pressure was useful.

Another improvement came when an adjustable precompression screw was incorporated into the fork cap. This design does not have a widespread usage due to its high profile. This is a major disadvantage because it impedes handlebar mounting location and adjustment. It is used on street bikes but there is another disadvantage. Due to the adjustment hex rising up above the triple clamps to extremes at minimum precompression adjustment, the resulting exposed edges create a safety problem for the user in the event of an accident.

A similar improvement came when a cam activated externally adjustable cap was introduced. U.S. Pat. No. 3,984,119 to Okazima (1976) discloses this system which is cam activated with a handle or knob extending above top triple clamp that again impedes the handlebar mounting and adjustment along with having only limited adjustment positions due to the cam type design.

Another means of precompression adjustment does not necessarily involve a mechanism. It consists of partial disassembly of suspension system to facilitate addition or subtraction of spacers. Adding spacers increases precompression and removing spacers decreases suspension precompression. One major problem this creates is foreign particles such as dirt may enter the hydraulic dampening system of the suspension forks. Many two wheeled vehicles are ridden off road and dirt and dust is thrown up onto the externals of the suspension and thus can be allowed into internals if disassembled. This can cause a reduction in bearing life and possible interruption in passage of oil through valving. Another major problem with this method of adjustment is unless special machined spacers have some sort of alignment collar included, there is the possibility of the spacers becoming misaligned, impeding inner fork tube travel at full compression. This can cause deformation of inner tube and sticktion when suspension is compressed and decompressed.

SUMMARY OF THE INVENTION

The object of the present invention is to provide an externally adjustable, low profile, light weight, precompression adjuster for popular two wheeled vehicle suspension designs. It also retains current oil dampener adjuster mechanism if present, without limiting handlebar location and adjustment.

One feature of the present invention is the provision of a threaded outer housing adapted to fit inside upper tube and house precompression adjustment mechanism.

Another feature of the present invention is the provision of a threaded adjuster hub that allows damper rod to screw into and hydraulic dampening adjustment screw to be placed within. This feature allows unlimited adjustment between minimum precompression and maximum precompression adjustment in the range of 0 to 100 mm.

In accordance with this object of the present invention, retention of adjuster hub by way of hub retaining spanner that allows adjuster hub to be rotated without moving up or down. This feature allows a wide range of handlebar adjustment at any precompression setting and the low profile design minimizes any safety hazard.

In accordance with another feature of the present invention a spring collar adapted to fit inside outer housing engaging adjuster hub moves up or down when adjuster hub is turned.

In accordance with this object of the present invention the provision of a spring collar rotational stop eliminating rotation and allowing movement u or down longitudinally with shock absorber column.

In accordance with this feature of the present invention the provision of spring locator which retains spring in the center of suspension tube so it does not conflict with inner tube movement.

In accordance with another feature of the present invention a ball spring detent mechanism is provided to enable the user to count the number of revolutions adjuster hub is turned and will also act as a holding device to retain desired adjustment position.

These features and advantages will become more apparent upon perusal of the following specifications taken in conjunction with the accompanying drawings wherein similar characters of reference refer to similar parts in each of the several views.

10 Adj. Precompression Cap Assembly
12 O-Ring Groove
14 Hub Retaining Spanner
16 Compression Spring
18 Outer Housing
20 Ball Bearing 22 O-Ring
24 O-Ring
26 Spring Collar
28 Adjuster Threads
30 Recessed Area
32 Spring Collar Rotational Stop
34 Main Compression Spring
38 Jam Nut
40 Upper Fork Tube
42 Hex Engagement Area
44 Spanner Engagements
46 Prior Art Hydraulic Dampener Adjuster Screw
48 Top Triple Clamp
50 Threaded Area of Damper Rod
52 Inner Thread for Damper Rod
54 Threaded Area of Outer Housing
56 Stop Engagement Area
58 Adjustment Hub
62 O-Ring Groove
64 Wrench Flats
66 Threaded Area of Spanner
68 Inner Bore
70 Landing
72 Motorcycle
74 Fork Assembly
78 Knob
84 Boss Section
86 Thread Engagement Area
88 Spring Locator
90 Air Pressure Release Screw

DETAILED DESCRIPTION OF PREFERRED EMBODIMENT

Figure 1:
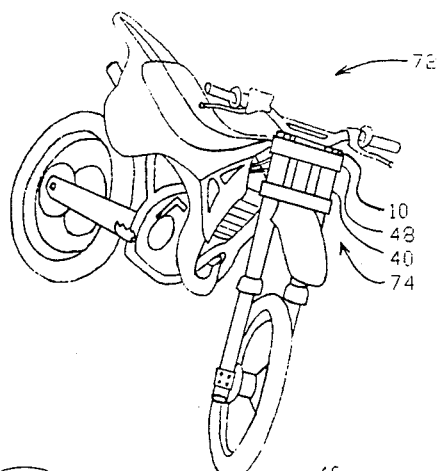
FIG. 1 is a perspective view of a motorcycle incorporating telescopic front suspension and the present invention.
Figure 2:
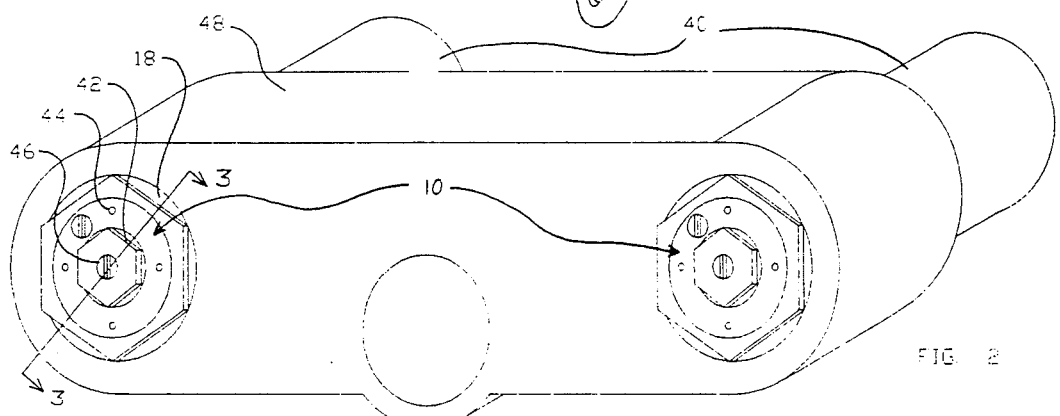
FIG. 2 is a perspective view of a motorcycle top triple clamp incorporating to portion of upper tubes and present invention.
Figure 3:
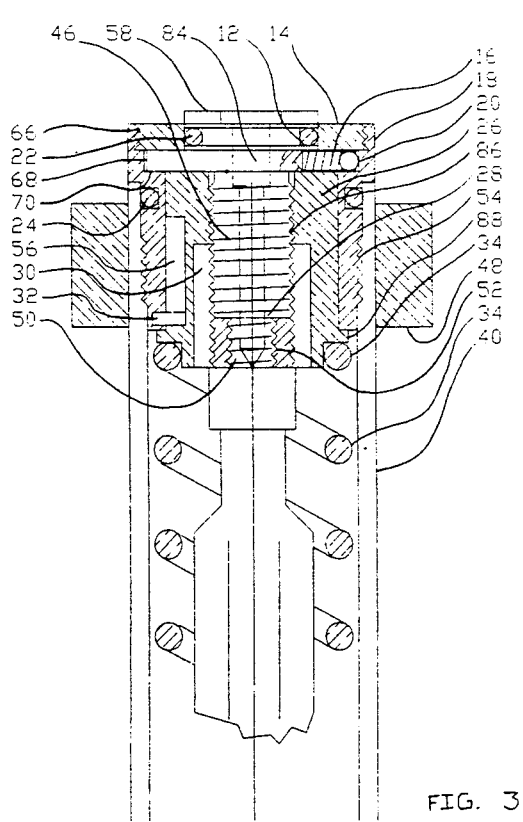
FIG. 3 is a cross sectional view of the upper fork tube incorporating present invention.
Figure 4:
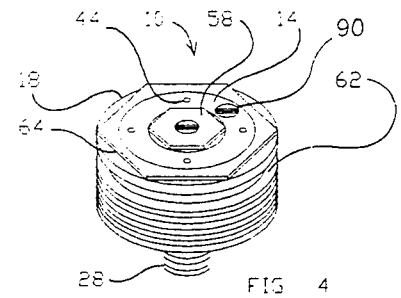
FIG. 4 is a perspective view of present invention removed.

Referring now to the drawing in FIG. 1, there is an illustration of a motorcycle 72 provided with a telescoping fork assembly 74 incorporating present invention. Referring now to FIG. 2–4, an adjustable precompression cap 10 includes an outer housing 18 adapted to fit inside upper tube at threaded area 54. A hex engagement area 42 for means of turning adjustment hub is also provided. A hub retaining spanner 14 threads into the outer housing 18 at threaded area 66 of spanner. Spanner engagements 44 are included for means of turning spanner in assembly. Outer housing threads into upper fork tube 40 which is attached via top triple clamp 48 and includes an O ring oil seal groove 62 to house O ring 24 and wrench flats 64 are provided for assembly.

The adjustment hub 58 is provided with a boss section 84 housed by inner bore 68, the hub retaining spanner 14, and landing 70. Adjuster threads 28 are provided to engage with thread engagement area 86. The hex engagement area 42 is provided along with and inner thread 52 to accept threaded area of damper rod 50. Prior art dampener screw 46 is also provided. An O ring oil seat 22 is housed in O ring groove 12. Spring collar 26 is provided with a pin engagement area 56 and dowel pin 32 is pressed in outer housing 18 and extends into stop engagement area 56. A recessed area 30 is included along with the threaded engagement area 86.

A ball bearing 20 and compression spring 16 detent mechanism is provided in conjunction with the adjuster hub 58 and engages the outer housing at machined detent grooves.

Spring collar 26 interfaces with the compression spring 34 at spring locator 88. Spring locator 88 provides constant main compression spring concentricity with upper tube which is lost when using the spacer method of precompression adjustment. Air pressure release screw 90 is shown a means of evacuating pressure build up in fork shock absorber.

Figure 5:
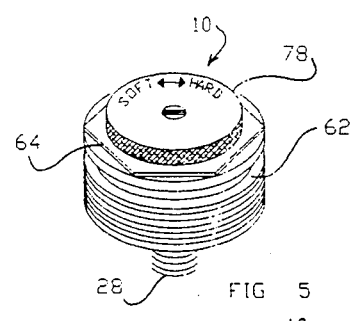
FIG. 5 is a perspective view of present invention with hand means of adjustment.

Now referring to FIG. 5, a knob 78 is shown that could be offered in replacement to the hex engagement area 42 for means of turning adjuster hub by hand.

Figure 6:
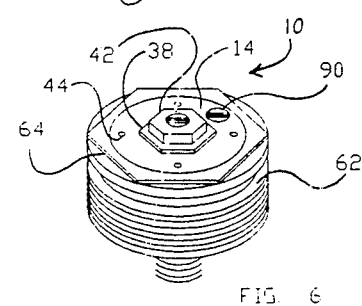
FIG. 6 is a perspective view of present invention incorporating jam nut as means of adjustment retention.

Now referring to FIG. 6, jam nut 38 is shown that could take the place of ball and spring detent mechanism for means of retaining desired precompression setting.

Of course the present invention is not intended to be restricted to any particular form or arrangement or any specific embodiment disclosed herein, or any specific use, since the same may be modified in various particulars or relations without departing from the spirit or scope of the claimed invention hereinabove shown and described of which the apparatus is intended only for illustration and for disclosure on an operative embodiment and not to show all of the various forms or modification in which the invention might be embodied or operated.

The invention has been described in considerable detail in order to comply with the patent laws by providing full public disclosure of at least one of its forms. However, such detailed description is not intended in any way to limit the broad feature or principles of the invention, or the scope of patent monopoly to be granted.

I claim:

1. An adjustable precompression cap comprising:
   (a) an outer housing connectable to a shock absorber telescoping user;
   (b) an adjuster hub fitted and retained inside said outer housing;
   (c) a spring collar fitted inside said outer housing interfacing a suspension compression device;
   (d) a spring collar rotational stop engaging said outer housing and interfacing with said spring collar at a stop engagement area;
   (e) a spring locator interfacing with said spring collar;
   (f) a hub retaining spanner threaded into said outer housing; and
   (g) an oil seal interfacing with said adjuster hub and said hub retaining spanner.

2. A cap in accordance with claim 1, wherein a prior hydraulic damping screw is retained.

3. A cap in accordance with claim 1, wherein an air pressure relief crew is provided.

4. A cap in accordance with claim 1, wherein a ball bearing and spring detent mechanism is provided interfacing between said adjuster hub and said outer housing.

5. An adjustable precompression cap comprising:
   (a) an outer housing connectable to a shock absorber telescoping tube;
   (b) an adjuster hub fitted and retained inside said outer housing;
   (c) a spring collar fitted inside said outer housing interfacing a suspension compression device;
   (d) a spring collar rotational stop engaging said outer housing and interfacing switch said spring collar at a stop engagement area;
   (e) a spring locator interfacing with said spring collar; and
   (f) a hub retaining spanner threaded into said outer housing.

6. A cap in accordance with claim 5, wherein a prior hydraulic dampening screw is retained.

7. A cap in accordance with claim 5, wherein an air pressure relief screw is provided.

8. A cap in accordance with claim 5, wherein a ball bearing and spring detent mechanism is provided inferring between said adjuster hub and said outer housing.

9. A cap in accordance with claim 5, wherein said spring collar has a longitudinal groove on an outside diameter extending a full length of a side thereof.

10. A cap in accordance with claim 5, wherein a means of hand adjustment is provided connected to said adjuster hub.

11. An adjustable precompression cap comprising:

(a) an outer housing connectable to a shock absorber telescoping tube;
(b) an adjuster hub fitted and retained inside said outer housing;
(c) a spring collar fitted inside said outer housing interfacing a suspension compression device;
(d) a spring collar rotational stop engaging said outer housing and interfacing with said spring collar at a stop engagement area; and
(e) a knob fitted outside said outer housing connectable to said adjuster hub.

12. A cap in accordance with claim 11, wherein a jam nut is provided for means of retaining precompression adjustment.

* * * * *

UNITED STATES PATENT AND TRADEMARK OFFICE
CERTIFICATE OF CORRECTION

PATENT NO. : 5,301,973
DATED : April 12, 1994
INVENTOR(S) : Rich Truchinski

It is certified that error appears in the above-indentified patent and that said Letters Patent is hereby corrected as shown below:

Column 4, line 32, Claim 1, change "user" to -- tube --;

line 48, change "crew" to -- screw --;
        line 61, change "switch" to -- with --.

Signed and Sealed this

Twenty-fifth Day of April, 1995

*Attest:*

BRUCE LEHMAN

*Attesting Officer*     *Commissioner of Patents and Trademarks*